Sept. 19, 1939.   G. R. VON RADIIS ET AL   2,173,794
CONVERTIBLE VEHICLE OF THE "CATERPILLAR" TYPE WITH RETRACTABLE ROAD WHEELS
Filed Nov. 19, 1937   4 Sheets-Sheet 3
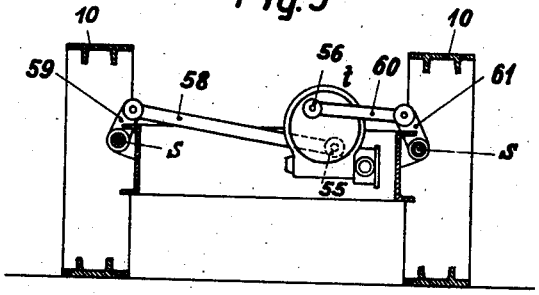
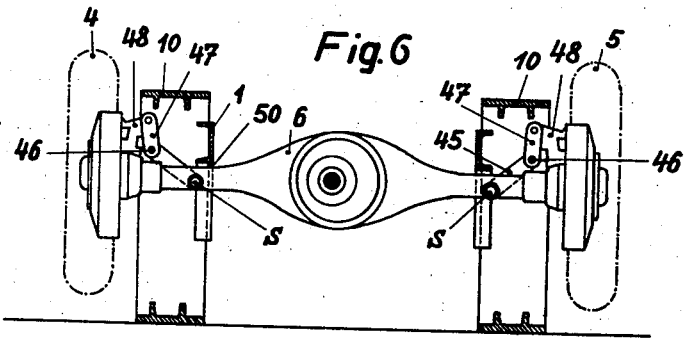
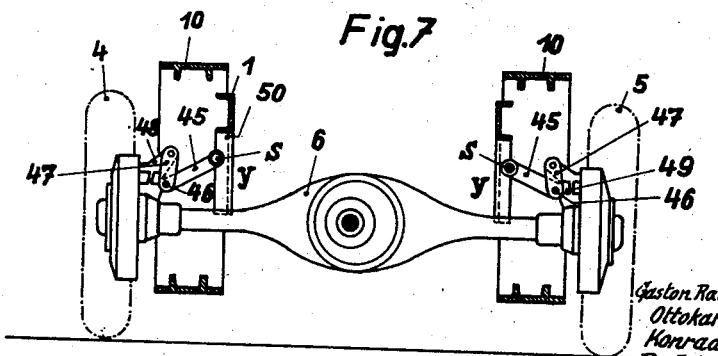
Gaston Radis VON RADIIS
Ottokar PATZL
Konrad KUSCHEL
Rudolf KLANNER
Franz ZABRANSKY
INVENTORS
BY Haseltine, Lake & Co.
ATTORNEYS

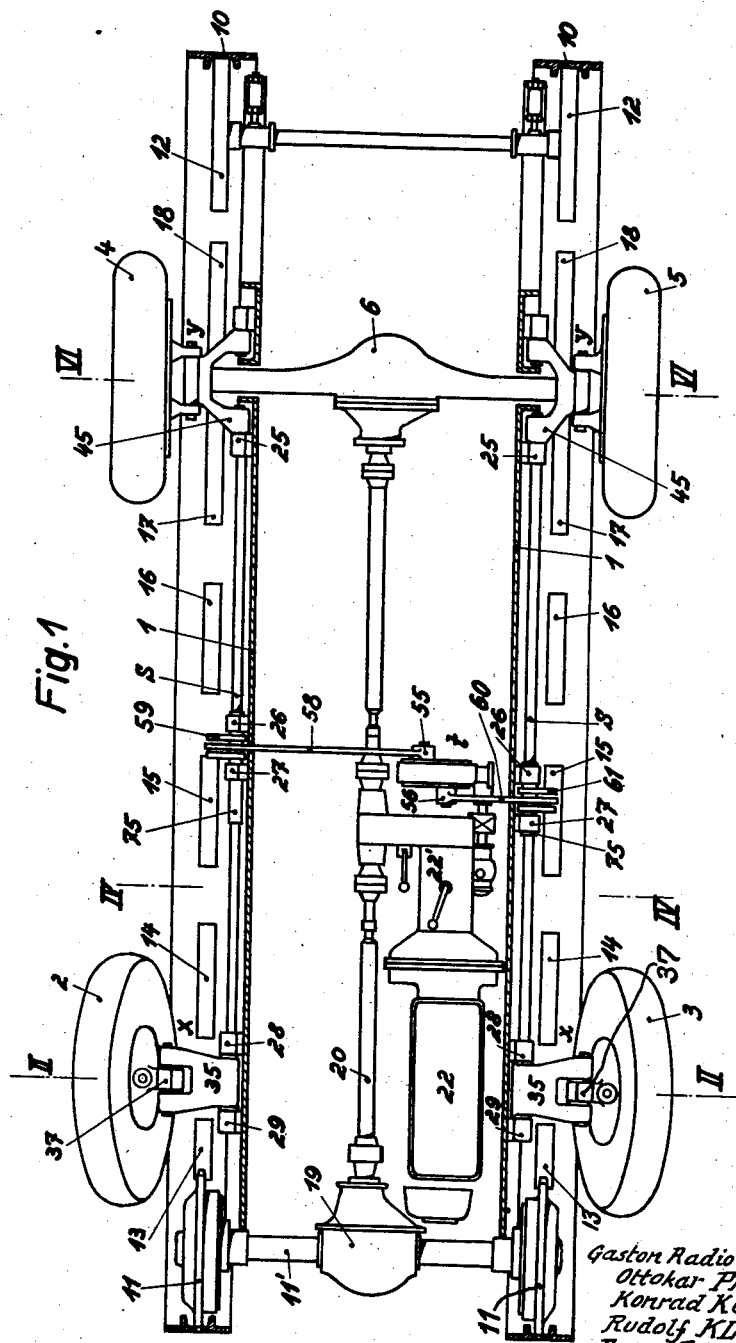

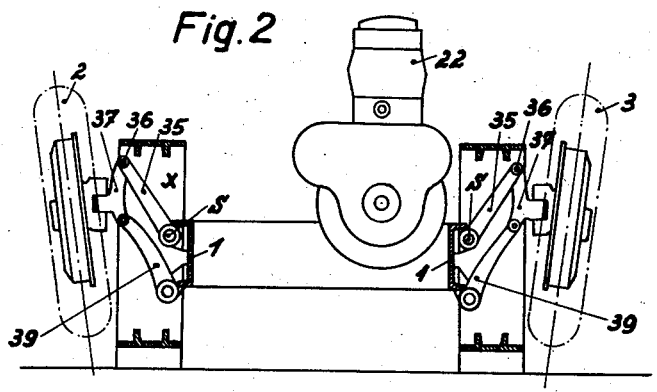
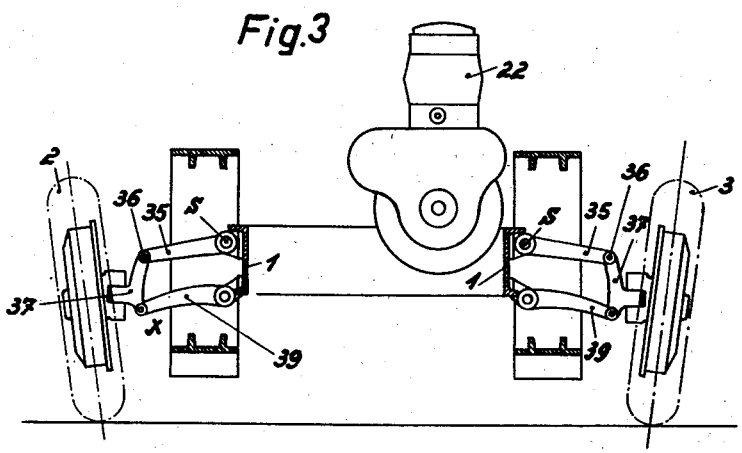
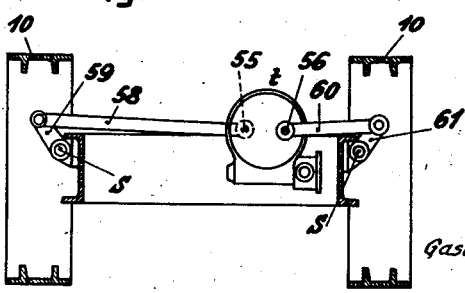

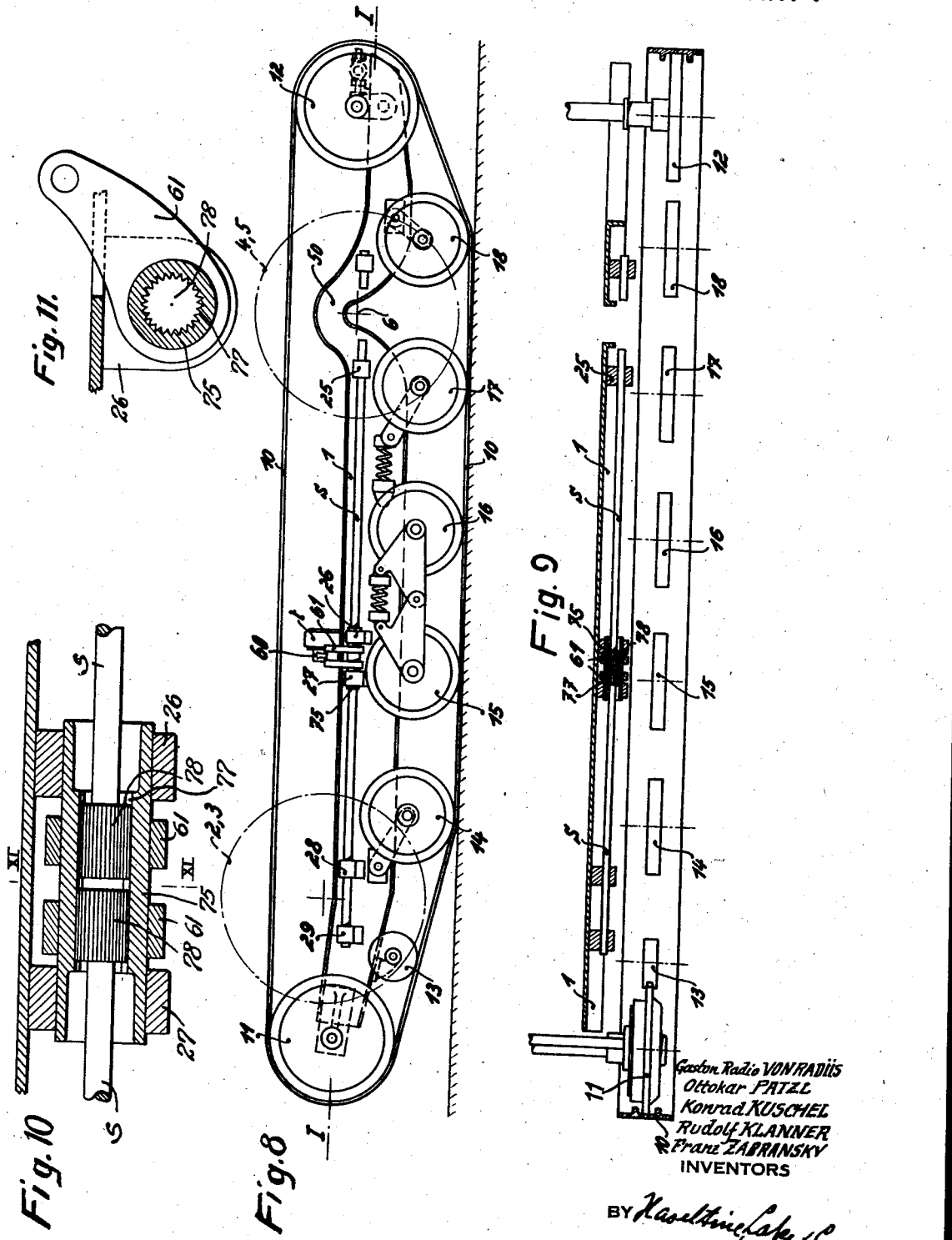

Patented Sept. 19, 1939

2,173,794

UNITED STATES PATENT OFFICE 2,173,794

CONVERTIBLE VEHICLE OF THE "CATERPILLAR" TYPE WITH RETRACTABLE ROAD WHEELS

Gaston Radio von Radiis, Ottokar Patzl, Konrad Kuschel, Rudolf Klanner, and Franz Zabransky, Vienna, Austria, assignors to the firm Oesterr. Saurer-Werke Aktiengesellschaft, Vienna, Germany Application November 19, 1937, Serial No. 175,410
In Austria November 25, 1936

14 Claims. (Cl. 180—9.1)

This invention relates to convertible "caterpillar" vehicles with retractable wheels, of the type in which the wheels are disposed outside and clear of the "caterpillar" tracks.

In vehicles of this type the track of the wheels, and more particularly that of the more widely spaced swivelling wheels (front wheels) determines the overall breadth of the vehicle. If, as is in the case in the types of construction hitherto known, the wheels are retracted vertically upwards when converting the vehicle back from being a vehicle of the wheel type to being a vehicle of the "caterpillar" type the overall breadth of the vehicle remains unchanged. Now vehicles of this description are often required to travel along narrow lanes and defiles with banks or other confining obstructions at the sides, and for this reason it is highly desirable to keep down the over-all breadth of the vehicle to a minimum when converted for use as a "caterpillar" vehicle.

For this purpose, according to the present invention, when changing over from wheel to "caterpillar" locomotion, the wheels of the vehicle are not only retracted vertically upwards but also laterally inwards, that is to say horizontally towards the "caterpillar" tracks, with the result that the over-all breadth of the vehicle is reduced when changing over from wheel to "caterpillar" locomotion.

The invention further relates to appropriate means for the raising, lowering, and lateral displacement of the wheels, for the described purpose.

A form of construction of an automotive vehicle embodying the invention is shown, by way of example, in the accompanying drawings, in which:

Fig. 1 shows the vehicle in sectional plan view taken on the place indicated by the line I—I in Fig. 8.

Figs. 2 and 3 are transverse sections taken on the line II—II in Fig. 1, in the condition for "caterpillar" locomotion and in that for wheel locomotion, respectively.

Figs. 4 and 5 are transverse sections taken on the line IV—IV in Fig. 1, in the condition for wheel locomotion and in that for "caterpillar" locomotion, respectively.

Figs. 6 and 7 are cross-sections taken on the line VI—VI in Fig. 1, with the vehicle in the condition for "caterpillar" locomotion and in that for wheel locomotion, respectively.

Fig. 8 shows the chassis of the vehicle in side elevation.

Fig. 9 shows in sectional plan view a detail of the vehicle according to the invention, the parts shown being depicted in a spread out condition for the sake of clearness.

Fig. 10 shows the crank arm structure and arrangement of Fig. 5 in longitudinal section and on a greatly enlarged scale.

Fig. 11 is a cross section of Fig. 10 taken on line XI—XI.

Referring to these drawings, 1 denotes the two longitudinal main members of the frame of the vehicle, 2 and 3 denote the front wheels, 4 and 5 the rear wheels, and 6 denotes the rear axle. 10 denotes the endless "caterpillar" tracks which travel over driving rollers 11, guide or jokey rollers 12, and a series of running or track rollers 13—18. The axle 11' of the driving rollers 11 takes its drive from the engine 22 through the intermediary of gearing 19 and a propeller shaft 20. The gearing 19 embodies the necessary clutches and brakes for steering the vehicle when adapted for "caterpillar" locomotion. As may be seen more particularly from Fig. 1 the track of the wheels 2, 3, 4, 5 is wider than the track of the "caterpillars" 10, that is to say the wheels are disposed outside the "caterpillar" tracks 10, with respect to the chassis of the vehicle.

The vehicle is equipped with sets of jacking mechanism $x$, $y$. The jacks $x$ serve for raising and lowering the front wheels 2, 3, and the jacks $y$ for raising and lowering the rear wheels 4, 5. The operating of the jacks $x$, $y$ is effected by the rotation of simple torsion rods, that is to say rods or shafts which, in contradistinction to multiple torsion rods (so-called bundle springs), are subjected to purely torsional stress. The torsion rods $s$ are disposed longitudinally of the vehicle, are rotatable in bearings 25—29, and at the same time constitute the resilient means for the sprung suspension of the wheels of the vehicle.

The jacks $x$ for the front wheels 2, 3 (Figs. 2 and 3) are so constructed that on changing over to "caterpillar" locomotion the wheels 2, 3 are not merely raised but also moved laterally towards the "caterpillar" tracks 10, that is to say, the wheels 2 and 3 are brought nearer together. Each jack consists of an arrangement of levers composed of links forming a polygon and preferably a quadrangle. In the present constructional example the jack $x$ consists of an arm 35 which is attached to the torsion rod $s$, and which is articulated with its free end 36 to the part 37 of the wheel supporting means. The steering swivel of each of the front wheels is pivoted in a manner known per se on the part 37 by means of a steering swivel journal. Apart from the lifting arm 35 there are further provided guiding means which takes the form in the present instance of a link 39. As may be seen from a comparison of Figs. 2 and 3 the jacking mechanism described and shown constitutes means for the controlled raising and lowering of the front wheels relatively to the remainder of the vehicle. During raising and lowering, the wheels 2 and 3 are displaced parallel to each other. In addition the wheels 2 and 3 are also brought nearer to the "caterpillar" tracks 10 during the lifting, i. e. the spacing of the front wheels apart is reduced as these wheels are raised (see Fig. 2).

The jacks y for the rear wheels are so constructed in the present instance that the rear axle 6 is raised and lowered bodily together with the wheels. Figs. 6 and 7 of the drawings show the jacks y in detail; they consist of arms 45 attached to the torsion rod s and connected by means of links 47 articulated to their free ends 46 with bearing lugs 48 pertaining to the rear axle 6. 49 denotes buffers of elastic material, for example rubber, provided for the purpose of preventing lateral movement of the rear axle relatively to the chassis during wheel locomotion. As may be seen from Fig. 8, the longitudinal main members 1 of the frame of the vehicle are provided with an upwardly cranked portion 50 to allow of lifting the rear axle.

For the twisting of the torsion rods s there is provided driving mechanism t which according to the invention consists of crank gear, this gear being so disposed that the crank axle is parallel to the longitudinal axis of the vehicle. The crank gear for rotating the torsion rods takes its drive from the engine of the vehicle.

The crank arms 56 and 61 are connected, with the interposition in each case of a sleeve 75, with the respective torsion rods s. The setting sleeves 75 are supported idly rotatable in bearings 26, 27, and are provided on the inside with locking means such as for instance inside teeth, inside tonguing and grooving or the like, 77 with which there are adapted to interengage thickened portions 78 of the torsion rods s furnished with corresponding teeth, tonguing and grooving, or the like on the outside (see Figs. 10 and 11).

The vehicle according to the present invention admits of very rapid and perfectly reliable changing over from wheel locomotion to "caterpillar" locomotion and vice-versa. To change over from wheel to "caterpillar" locomotion the driving mechanism t is set in operation from the driver's seat which is disposed adjacent the engine 22 and the main gear-box 22'. The crank or knuckle pins 55, 56 are thereby moved from the position shown in Figs. 1 and 4 into the position shown in Fig. 5. This movement is transmitted to the crank arms 59, 61 by means of the links 58 and 60. By means of the set-sleeves 75 the torsion rods s are so adjusted that the front wheels are lifted simultaneously with the rear axle 6 and the rear wheels 4, 5. The vehicle is thereby lowered bodily until it rests with the "caterpillar" tracks 10 upon the ground. As the front wheels are raised they are at the same time brought nearer to the "caterpillar" track 10 on each side, and in this manner the over-all breadth of the vehicle is reduced (see Fig. 2) on changing over from wheel or "caterpillar" locomotion.

The changing back again from "caterpillar" to wheel locomotion is equally rapidly carried out. For this purpose it is merely necessary to operate the requisite controls, again from the driver's seat, to rotate the crank disc with the cranks 55, 56 with the aid of the engine, until the position of these parts shown in Fig. 4 is reached, in which the wheels of the vehicle assume the operative position in which they are shown in Figs. 3 and 7. The front wheels are then spaced so far from the "caterpillar" tracks 10 that the swivelling of these wheels for the purpose of steering the vehicle is not impeded or restricted by the "caterpillar" tracks.

The vehicle described above and shown in the accompanying drawings only represents one of the many possible forms of construction embodying the invention, and it is to be understood that the general lay out and the details of the vehicle may be modified unrestrictedly within the scope and spirit of the invention as set forth.

What we claim is:

1. In a convertible vehicle of the type having articulated tractor tracks and retractable road wheels disposed laterally outside said tracks, for alternate track and wheel locomotion, plural means pivoted to said vehicle and carrying at least one pair of road wheels so as to be capable of raising the same to inoperative position by imparting simultaneous lifting movement and lateral movement inwardly about the pivotal mountings toward the middle axis of the vehicle for the purpose of reducing the over-all breadth of the vehicle when the said road wheels are in the retracted position and the vehicle rests upon the said articulated tractor tracks.

2. In a convertible vehicle of the type having articulated tractor tracks and retractable road wheels disposed laterally outside said tracks, a frame for said vehicle, at least one pair of outriggers articulated to and extending laterally outwards from the frame on opposite sides thereof, a road wheel mounted on the outer end of each of said outriggers, and means for imparting controlled pivotal movement to said outriggers relatively to said frame, whereby when said outriggers are swung in an upward direction the road wheels mounted thereon are simultaneously lifted and moved as a whole laterally toward the tractor tracks so as to reduce the overall width of the vehicle from the width thereof when the wheels are in operative position.

3. In a convertible vehicle of the type having articulated tractor tracks and retractable road wheels disposed outside said tracks, at least one pair of outriggers articulated to and extending laterally outwards from the frame of the vehicle on opposite sides thereof, a road wheel mounted on the outer end of each of said outriggers, each pair of said outriggers having their points of articulation at each end spaced vertically apart, and means for imparting controlled pivotal movement to the said outriggers relatively to said frame whereby on upward movement of said outriggers said wheels are simultaneously lifted and moved laterally toward the tractor tracks.

4. In a convertible vehicle of the type having articulated tractor tracks and retractable road wheels disposed outside said tracks, at least one pair of outriggers of equal length articulated to and extending laterally outwards from the frame of the vehicle on opposite sides thereof, a road wheel mounted on the outer end of each of said outriggers, said outriggers being composed of a rectangle of moving links, and means for imparting controlled pivotal movement to the said outriggers relatively to said frame whereby on upward movement of said outriggers said wheels are simultaneously lifted and moved laterally toward the tractor tracks.

5. In a convertible vehicle of the type having articulated tractor tracks and retractable road wheels disposed outside said tracks, torsion rods subjected purely to torsional stress and supported in the frame of the vehicle, a pair of outriggers articulated to and extending laterally outwards from the said frame at their front portion and fast on the said torsion rods, a swivelling front wheel conventionally supported on the outer end of each of said outriggers, a back axle unit suspended from said torsion rods, arms fast on said torsion rods in the vicinity of said back axle unit, links articulated to the outer ends of said arms and to said back axle unit, and means for rotating said torsion rods and thereby imparting controlled pivotal movement to said outriggers and arms whereby the front wheels of the vehicle are simultaneously lifted and moved laterally nearer to the tractor tracks and the back axle unit lifted bodily.

6. In a convertible vehicle of the type having articulated tractor tracks and retractable road wheels disposed outside said tracks, a frame for said vehicle, at least one pair of outriggers articulated to and extending laterally outwards from the said frame on opposite sides thereof, a road wheel mounted on the outer end of each of said outriggers, the said outriggers being disposed substantially horizontally when said road wheels rest upon the ground, and means for imparting controlled pivotal movement to the said outriggers relatively to the said frame, whereby when said outriggers are swung in an upward direction the road wheels mounted thereon are simultaneously lifted and moved inwards towards the middle longitudinal axis of the vehicle.

7. In a convertible vehicle of the type having articulated tractor tracks and retractable road wheels disposed outside said tracks, a frame for said vehicle, at least one pair of outriggers articulated to and extending laterally outwards from the said frame on opposite sides thereof, a road wheel mounted on the outer end of each of said outriggers, said outriggers being composed of a polygon of moving links adapted to secure parallel movement of translation of said wheels and disposed substantially horizontally when said road wheels rest upon the ground, and means for imparting controlled pivotal movement to the said outriggers relatively to said frame whereby on upward movement of said outriggers said wheels are simultaneously lifted and moved inwards towards the center line of the vehicle.

8. In a convertible vehicle of the type having articulated tractor tracks and retractable road wheels disposed outside said tracks, a frame for said vehicle, at least one pair of outriggers articulated to and extending laterally outwards from the said frame on opposite sides thereof, a road wheel mounted on the outer end of each of said outriggers, said outriggers being composed of a rectangle of moving links adapted to secure parallel movement of translation of said wheels and disposed substantially horizontally when said road wheels rest upon the ground, and means for imparting controlled pivotal movement to the said outriggers relatively to said frame whereby on upward movement of said outriggers said wheels are simultaneously lifted and moved inwards towards the center line of the vehicle.

9. In a convertible vehicle of the type having articulated tractor tracks and retractable road wheels disposed outside said tracks, a frame for said vehicle, torsion rods supported in said frame, at least one pair of outriggers articulated to and extending laterally outwards from said frame on opposite sides thereof and fast on the said torsion rods, a road wheel on the outer end of each of said outriggers, said outriggers being disposed substantially horizontally when said road wheels rest upon the ground, and means for rotating said torsion rods and thereby imparting controlled pivotal movement to said outriggers relatively to said frame whereby on upward movement of the outriggers the wheels mounted thereon are simultaneously lifted and moved inwards towards the center line of the vehicle.

10. In a convertible vehicle of the type having articulated tractor tracks and retractable road wheels disposed outside said tracks, a frame for said vehicle, torsion rods supported in said frame, at least one pair of outriggers articulated to and extending laterally from said frame outwardly on opposite sides thereof and fast on the said torsion rods, a road wheel on the outer end of each of said outriggers, said outriggers being disposed substantially horizontally when said road wheels rest upon the ground, and means consisting of crank gear supported in said frame with its axis of rotation parallel to the longitudinal axis of the vehicle and transmission elements between said gear and said torsion rods for rotating said torsion rods and thereby imparting controlled pivotal movement to said outriggers relatively to said frame whereby on upward movement of the outriggers the wheels mounted thereon are simultaneously lifted and moved inwards towards the center line of the vehicle.

11. In a convertible automotive vehicle of the type having articulated tractor tracks and retractable road wheels disposed outside said tracks, for alternative "caterpillar" and wheel locomotion, a rigid frame for said vehicle, torsion rods supported in said frame, at least one pair of outriggers articulated to and extending laterally outwards from said frame on opposite sides thereof and fast on the said torsion rods, a road wheel conventionally mounted on the outer end of each of said outriggers, said outriggers being disposed substantially horizontally when said road wheels mounted thereon rest upon the ground, and means consisting of crank gear supported in said frame with its axis of rotation parallel to the longitudinal axis of the vehicle, controllable power transmission means between the engine of the vehicle and the said crank gear, and transmission elements between said crank gear and said torsion rods for rotating said torsion rods and thereby imparting controlled pivotal movement to said outriggers relatively to said frame whereby on upward movement of the outriggers the wheels mounted thereon are simultaneously lifted and moved inwards towards the center line of the vehicle.

12. In a convertible vehicle of the type having articulated tractor tracks and retractable road wheels disposed outside said tracks, for alternative "caterpillar" and wheel locomotion, a rigid vehicle frame, torsion rods supported in said frame, at least one pair of outriggers articulated to and extending laterally outwards from said frame on opposite sides thereof and fast on the said torsion rods, a road wheel conventionally supported at the outer end of each of said outriggers, said outriggers being disposed substantially horizontally when said road wheels rest upon the ground and each comprising an arm fast on one of said torsion rods and having its free outer end articulated to an element of the conventional wheel supporting means and a link articulated to the said frame and to said wheel supporting means to secure parallel movement of translation of said road wheels, and means for rotating said torsion rods thereby imparting controlled pivotal movement to said outriggers relatively to said frame whereby on upward movement of the outriggers the wheels mounted thereon are simultaneously lifted and moved inwards towards the center line of the vehicle.

13. In a convertible vehicle of the type having articulated tractor tracks and four retractable road wheels disposed outside said tracks, a rigid frame for said vehicle having its longitudinal side members cranked upwardly at their rear portion, torsion rods supported in said frame, a pair of outriggers articulated to and extending laterally outwards from said longitudinal frame members at their front portion and fast on the said torsion rods, a swivelling front wheel conventionally mounted on the outer end of each of said outriggers, a back axle unit suspended from said torsion rods in alignment with the cranked portion of said longitudinal frame members, linking means articulated to said back axle unit and fast on said torsion rods and adapted to translate rotation of said rods into vertical movement of said unit, and means for rotating said torsion rods and thereby imparting controlled pivotal movement to said outriggers and linking means whereby the front wheels are simultaneously lifted and moved towards the centre line of the vehicle and the back axle unit lifted bodily into the recesses formed by said cranked portion of the longitudinal frame members.

14. In a convertible vehicle of the type having articulated tractor tracks and four retractable road wheels disposed outside said tracks, a rigid frame for said vehicle having its longitudinal side members cranked upwardly at their rear portion, torsion rods supported in said frame, a pair of outriggers articulated to and extending laterally outwards from the said longitudinal frame members at their front portion and fast on the said torsion rods, a swivelling front wheel conventionally supported on the outer end of each of said outriggers, a back axle unit suspended from said torsion rods in alignment with the cranked portion of said longitudinal frame members, arms fast on said torsion rods in the vicinity of said back axle unit, links articulated to the outer ends of said arms and to said back axle unit, and means for rotating said torsion rods and thereby imparting controlled pivotal movement to said outriggers and arms whereby the front wheels of the vehicle are simultaneously lifted and moved towards the center line of the vehicle and the back axle unit lifted bodily into the recesses formed by said cranked portion of the longitudinal frame members.

GASTON RADIO von RADIIS.
OTTOKAR PATZL.
KONRAD KUSCHEL.
RUDOLF KLANNER.
FRANZ ZABRANSKY.